US 6,438,673 B1

(12) United States Patent
Jourdan et al.

(10) Patent No.: US 6,438,673 B1
(45) Date of Patent: Aug. 20, 2002

(54) CORRELATED ADDRESS PREDICTION

(75) Inventors: Stephan J. Jourdan, Portland, OR (US); Michael Bekerman, Campbell, CA (US); Ronny Ronen; Lihu Rappoport, both of Haifa (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/475,063

(22) Filed: Dec. 30, 1999

(51) Int. Cl.$^7$ .............................................. G06F 12/00
(52) U.S. Cl. .................... 711/213; 711/214; 712/240
(58) Field of Search ................ 711/125, 145, 711/213, 214; 712/207, 233, 205, 240, 239

(56) References Cited

U.S. PATENT DOCUMENTS

| | | | | | |
|---|---|---|---|---|---|
| 5,751,996 | A | * | 5/1998 | Glew et al. ................... | 711/145 |
| 5,764,970 | A | * | 6/1998 | Ranna et al. ................. | 712/233 |
| 5,909,566 | A | * | 6/1999 | Cai et al. ..................... | 712/207 |
| 6,108,775 | A | * | 8/2000 | Shiell et al. ................. | 712/240 |
| 6,154,830 | A | * | 11/2000 | Sugimura .................... | 712/205 |
| 6,189,091 | B1 | * | 2/2001 | Col et al. .................... | 712/240 |
| 6,247,097 | B1 | * | 6/2001 | Sinharoy ..................... | 711/125 |
| 6,247,121 | B1 | * | 6/2001 | Akkary et al. ............... | 712/239 |
| 6,247,122 | B1 | * | 6/2001 | Henry et al. ................. | 712/239 |

OTHER PUBLICATIONS

Sazeides et al, "The Performance Potential of Data Dependence Speculation & Collapsing", Proceedings of the 29$^{th}$ Annual IEEE/ACM International Symposium on Microarchitecture, MICRO–29, pp. 238–247, Dec. 2–4, 1996, Paris, France, IEEE Computer Society Press, Los Alamitos, California.

Sazeides et al, "The Predictability of Data Values", Proceedings of the Thirtieth Annual IEEE/ACM International Symposium on Microarchitecture, pp. 248–258, Dec. 1–3, 1997, Research Triangle Park, United States, 1997 IEEE, 1072–4451/97.

Harrison, Luddy, "Examination of a Memory Access Classification Scheme for Pointer–Intensive and Numeric Programs", Proceedings of the 1996 International Conference on Supercomputing, pp. 133–140, May 25–28, 1996, Philadelphia, Pennsylvania, ICS '96, Philadelphia, PA, USA, 1996 ACM 0–89791–803–7/96/05.

* cited by examiner

Primary Examiner—David Hudspeth
Assistant Examiner—Fred F. Tzeng
(74) Attorney, Agent, or Firm—Kenyon & Kenyon

(57) ABSTRACT

A microprocessor having a correlated address predictor, and methods of performing correlated address prediction. A first table memory can be populated by a plurality of buffer entries. Each buffer entry can include a first buffer field to store a first tag based on an instruction pointer and a second buffer field to store an address history. A second table memory can be populated by a plurality of link entries. Each link entry can include a first link field to store a link tag based on an address history and a second link field to store a predicted address. A first comparator can be in communication with the first table memory and an instruction pointer input. A second comparator can be in communication with the first table memory and the second table memory. An output in communication with the second table memory.

18 Claims, 4 Drawing Sheets

CORRELATED ADDRESS PREDICTION

FIELD OF THE INVENTION

Embodiments of the present invention relate to microprocessors and computers. More particularly, embodiment of the present invention relate to address prediction methods and apparatus.

BACKGROUND OF THE INVENTION

Known microprocessors include pipelined instruction execution engines to increase microprocessor performance. An instruction pipeline can include a plurality of stages that perform instruction execution. For example, a simple instruction pipeline can include four stages: fetch instruction, fetch operands, execute instruction, and store result.

The fetch instruction stage typically retrieves the instruction to be executed based on an instruction pointer (IP) value stored in an instruction pointer register. The instruction pointer identifies the memory address (i.e., location) of the instruction. As each of a series of instructions is executed, the instruction pointer value is typically incremented an amount (e.g., a constant amount, a variable amount, etc.) to point to the address of the next instruction. At times, a new instruction pointer value can be loaded into the instruction pointer register to execute a specified set of instructions (e.g., when a subroutine is executed, to begin execution of a new program, after execution of a conditional branch instruction, etc.).

An instruction that is commonly executed by a microprocessor is a load instruction. A load instruction typically retrieves a data value from memory to load the data value into a processor register file. A component of microprocessor performance is the load-to-use latency. The load-to-use latency can be dependent on the amount of time required to load a data value from the main memory into a processor register file. When increased amounts of time are required to retrieve data from memory, microprocessor performance can be disadvantageously affected.

One technique known to reduce the load-to-use delay is to implement a memory hierarchy, which can include different levels of memory, where each level has a particular size and speed. A memory hierarchy can include on-chip memory (e.g., a level one cache memory that is on the same semiconductor chip as the microprocessor, a level one cache memory that is a portion of the microprocessor, etc.) and off-chip memory (e.g., a level two cache in a semiconductor chip that is in communication with the a microprocessor chip, etc.). Data stored in the on-chip memory typically can be retrieved significantly faster than data stored in the off-chip memory.

Frequently used data can be stored in the on-chip memory to increase microprocessor performance. When a data unit is to be retrieved, the on-chip memory can be checked to determine if the sought data unit is stored within the on-chip memory. When the memory contains the sought data unit; a "hit" has occurred and the data can be retrieved from the memory. When the memory does not contain the sought data unit, a "miss" has occurred and the next level of memory can be checked to determine if the sought data unit is stored in that next level. An exemplary memory hierarchy can include, in order of increasing load-to-use latency, on-chip cache memory (e.g., an on-chip L0 cache, an on-chip L1 cache, an on-chip L2 cache), off-chip cache memory (e.g., an L2 cache, an L3 cache), main memory, etc. Retrieval of data from the lower levels of the memory hierarchy (e.g., the main memory, etc.) usually has significantly higher load-to-use delays than retrieval of data from the higher levels of the memory hierarchy (e.g., on-chip cache memory, etc.).

Increasing the speed and size of the on-chip cache(s) is a known method to reduce the load-to-use delay. By storing greater amounts of data in the faster, higher levels of memory, the overall load-to-use latency can be reduced by increasing the proportion of data retrievals that retrieve data from faster on-chip cache(s) and reducing the proportion of data retrievals that access slower, lower levels of memory to retrieve the sought data.

Even when data is retrieved from an on-chip cache, the overall load-to-use latency can be dependent on load address generation, e.g., the amount of time taken to generate the memory address of the data to be loaded. For example, an instruction pointer can identify the address in memory where a first load instruction is stored. The first load instruction can be retrieved from the memory based on the instruction pointer. The first load instruction can include source operands that specify the memory location where the data to be loaded can be retrieved, and the actual memory load address may need to be computed based on the source operands.

Generation of the complete load address can be required prior initiating a cache access (e.g., for larger sized caches). To initiate cache access earlier, load memory addresses can be predicted. When load address prediction is performed early in the pipeline, e.g., at the time the instruction is fetched, cache access based on the predicted address and calculation of the actual address can be overlapped during the front part of the instruction pipeline. This can reduce the load-to-use latency.

Known load address prediction schemes typically only detect regular memory accesses using strides. A stride can be a fixed offset between successive memory load addresses. For example, when data is being accessed from a data array (e.g., a data table), the load address may be incremented by a constant value each time a load instruction is executed. In such an instance, load addresses can be predicted by incrementing the most recent load address by the constant value to generate a predicted address. Many sequences of data, however, are not regular (e.g., each load address of a particular load being offset by a constant value from the load address of the previous instance of the particular load, etc.). Absent such offsets of a constant value, a stride-predictor cannot operate advantageously.

In view of the foregoing, it can be appreciated that a substantial need exists for methods and apparatus which can advantageously perform correlated address prediction.

SUMMARY OF THE INVENTION

Embodiments of the present invention include apparatus and methods to perform correlated address prediction. A microprocessor can include a correlated address predictor that includes a first table memory and a second table memory. The first table memory can be populated by a plurality of buffer entries. Each buffer entry can include a first buffer field to store a first tag based on an instruction pointer and a second buffer field to store an address history. The second table memory can be populated by a plurality of link entries. Each link entry can include a first link field to store a link tag based on an address history and a second link field to store a predicted address. A first comparator can be in communication with the first table memory and an instruction pointer input. A second comparator can be in communication with the first table memory and the second table memory. An output in communication with the second table memory.

DETAILED DESCRIPTION

Embodiments of methods and apparatus to perform correlated address prediction are described. Embodiments of the present invention can perform address prediction based on a history of addresses, e.g., load address prediction based on a history of load addresses. A load buffer can store a history of load addresses for each given load instruction identified by an instruction pointer. A link table can store predicted load addresses, each predicted load address based on a history of prior load addresses. When a current load instruction identified by an instruction pointer is in the process of being executed, the instruction pointer can be used to access the load buffer to determine the load address history for the load instruction identified by the instruction pointer. The load address history can be used to access the link table to determine a predicted load address. The predicted load address can be used to perform a speculative memory access (e.g., a speculative load from a cache, etc.).

Figure 1:
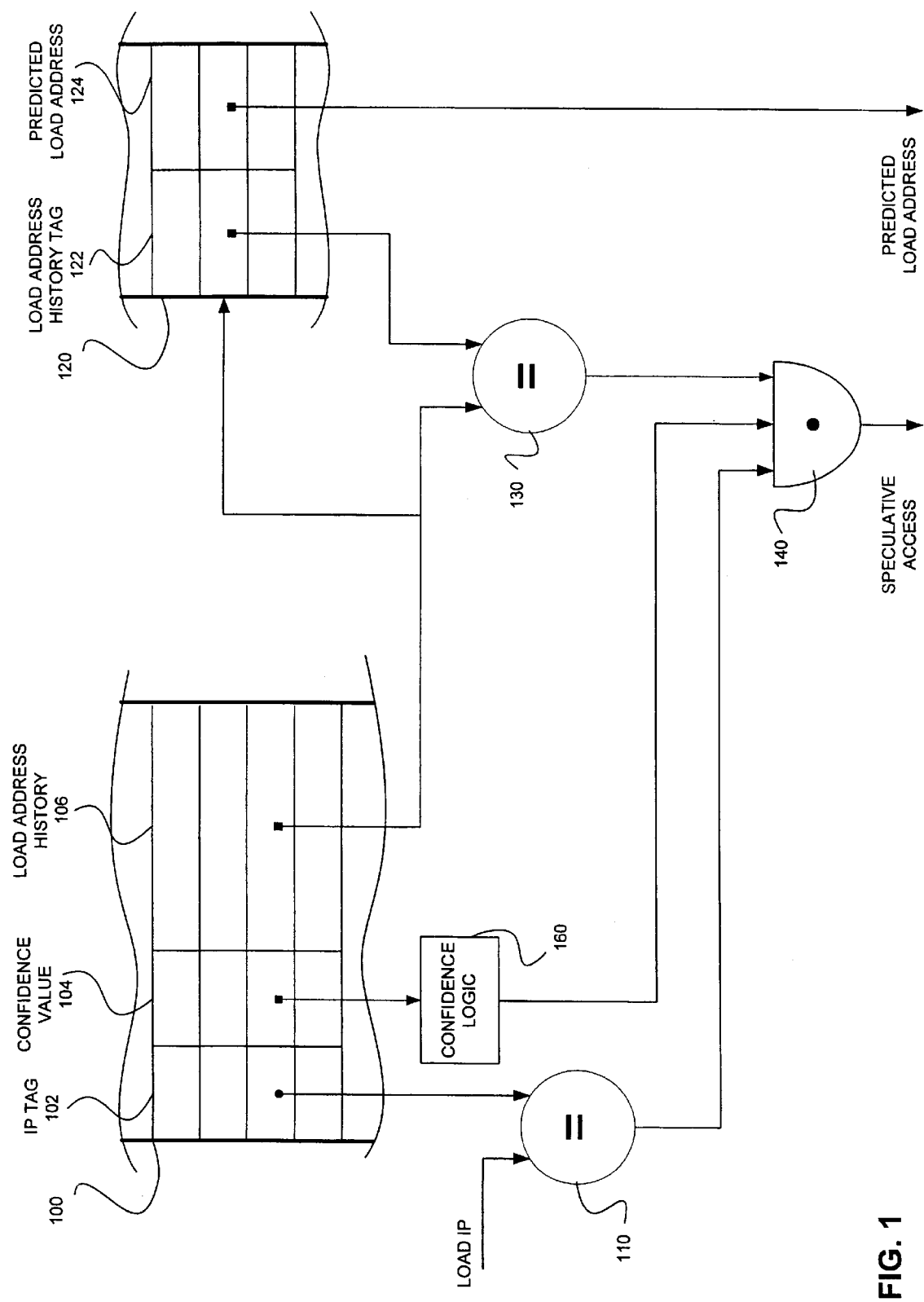
FIG. 1 shows an apparatus in accordance with an embodiment of the present invention.

FIG. 1 shows an apparatus in accordance with an embodiment of the present invention. Apparatus and methods in accordance with embodiments of the present invention can be part of, and/or executed by, a microprocessor having an instruction pipeline. The microprocessor can include a correlated load address predictor that includes a load buffer 100 and a link table 120.

Each of load buffer 100 and link table 120 can be implemented in a table memory, e.g., a table memory in a cache, a table memory in a memory, etc. Load buffer 100 can include a plurality of buffer entries. Each buffer entry may include an instruction pointer (IP) tag field 102 to store an IP tag corresponding a load IP of a particular load instruction, a confidence value field 104 to store a confidence value, and a load address history field 106 to store a load address history of the particular load instruction. The load buffer 100 can be indexed according to the LSBs (least significant bits) of at least a portion of each particular load IP, and the IP tags can consist of the MSBs (most significant bits) of at least a portion of each particular load IP. For example, in one embodiment, each load IP is a 20-bit value. Thus, in such an embodiment, the load buffer 100 can be indexed according to the 10 LSBs of the load IPs, and each IP tag stored in an IP tag field 102 of a buffer entry of load buffer 100 can be the 10 MSBs of each load IP.

The link table 120 can be indexed according to the load address history of a particular load instruction. Each link entry in the link table 120 can include (1) a load address history tag filed 122 corresponding to the load address history of a particular load instruction, and (2) a predicted load address field 124 to store a predicted load address of the particular load instruction. The link table 120 can be indexed according to the LSBs of the load address histories of particular load instructions, and the load address history tags can consist of the MSBs of each load address history. In other indexing and tag techniques are implemented, such as tagless structures, using MSBs to index, using LSBs to tag, etc.

Load buffer 100 can be in communication with first comparator 110, which can receive a load instruction pointer ("load IP") of a particular load instruction. The first comparator 110 can perform a tag comparison based on the received load IP and the IP tag fields 102 of the buffer entries of load buffer 100, and generate a load buffer hit/miss indication to indicate whether load buffer 100 stores load address history of the particular load instruction. In one embodiment, the load buffer hit/miss indication is a logical one (e.g., one of a first predetermined potential $V_{cc}$, and ground, etc.) when there is a load buffer hit, and is a logical one (e.g., the other one of a first predetermined potential $V_{cc}$, and ground, etc.) when there is a load buffer miss.

AND 140 can receive the load buffer hit/miss indication and generate a speculative access indication based in part on the load buffer hit/miss indication. Thus, in one embodiment, the speculative access indication is a logical zero when there is an operation buffer miss, and thereby indicates that speculative access is not to be performed. In one embodiment, the speculative access indication controls whether a speculative memory access (e.g., a speculative load from a cache, etc.) can be performed. For example, when there is a load buffer miss, there is no load address history that can be used to generate a predicted load address for a particular load instruction, and a speculative memory access cannot be performed for that particular load instruction.

When there is a load buffer hit based on the received load IP, a confidence value stored in a confidence value field 104 of the hit operation entry can be received by confidence logic 160. In one embodiment, the received confidence value is a counter value that is incremented on each correct prediction and reset to zero when there is a misprediction. For example, when there is an load buffer hit based on a load IP, and a predicted load address is generated based on a load address history of the hit buffer entry, a confidence value stored in confidence value field 104 of that hit operation entry can be incremented when the predicted address is correct and can be reset when the predicted address is incorrect.

The confidence logic 160 can generate a confidence indication based on the received confidence value. In one embodiment, the confidence indication can be a logical zero when the confidence value is not equal to or greater than a confidence threshold that enables speculative access. AND 140 can receive the confidence indication and generate the speculative access indication based in part on the confidence indication. Thus, in one embodiment, the speculative access indication is a logical zero when the confidence indication is a logical zero, and thereby indicates that a speculative memory access is not to be performed based on any generated predicted load address.

When there is an load buffer hit based on the load IP, the load address history stored in the load address history field 106 of the hit buffer entry can be received by second comparator 130. The second comparator 130 can perform a tag comparison based on the received load address history and the load address history tags of the link entries of link table 120, and generate a link table hit/miss indication to indicate whether link table 120 stores a predicted load address based on the received load address history. In one embodiment, the link table hit/miss indication is a logical one when there is a link table hit, and is a logical zero when there is a link table miss. AND 140 can receive the link table hit/miss indication and generate the speculative access indication based in part on the link table hit/miss indication. Thus, in one embodiment, the speculative access indication is a logical zero when there is a link table miss, and thereby indicates that speculative access is not to be performed.

When there is a link table hit based on the received load address history, a predicted load address stored in the predicted load address field 124 of the hit link entry can be output. Based on the status of speculative access indication, the predicted load address may or may not be used to perform a speculative memory access (e.g., a speculative load from a cache, etc.). In one embodiment, the speculative access indication may enable a speculative memory access based on the predicted load address when there is a load buffer hit, a link table hit, and the confidence value stored in the hit buffer entry of the load buffer is greater than or equal to a predetermined confidence threshold value. Speculative memory access, in one embodiment, may not be enabled when there is a load buffer miss or a link table miss. In such an embodiment, even when there is a load buffer hit, speculative memory access may not be enabled when the confidence value stored in the hit buffer entry of the load buffer is below a predetermined confidence threshold value.

The following table, Table One, illustrates a series of instances of a particular load instruction. For example, a series of instructions may consist of a repeated series of three instructions identified by three instruction pointers (IPs): (1) an ADD instruction identified by an IP X, (2) a LOAD instruction identified by an IP Y, and (3) a BRANCH instruction identified by an IP Z. Each instance of the ADD instruction can modify a register value, e.g., RegA+ Immediate Value->RegA. Each instance of the LOAD instruction can have a load address based on the register value, e.g., LOAD (RegA+Immediate Value)->RegB, which can load the value stored at the load address (Register A+Immediate Value) into Register B. Subsequent to each instance of the BRANCH instruction, the value stored in Register A can be further modified. Accordingly, the following instances of the LOAD instruction identified by an IP Y can be executed:

TABLE ONE

| INSTANCES | IP | INSTRUCTION | LOAD ADDRESS |
|---|---|---|---|
| 1 | 7 | IP Y | LOAD (Reg A, +Imm), (RegB) | 100 |
| 2 | 8 | IP Y | LOAD (Reg A, +Imm), (RegB) | 200 |
| 3 | 9 | IP Y | LOAD (Reg A, +Imm), (RegB) | 150 |
| 4 | 10 | IP Y | LOAD (Reg A, +Imm), (RegB) | 250 |
| 5 | 11 | IP Y | LOAD (Reg A, +Imm), (RegB) | 200 |
| 6 | 12 | IP Y | LOAD (Reg A, +Imm), (RegB) | 300 |

Based on such a series of instances the load instruction, a load buffer and a link table can be populated as follows in Table Two at a time after execution of each of at least 6 instances of the load instruction (e.g., after the $1^{st}$ through $6^{th}$ instances of the load instruction). In particular, because the load buffer stores a load address history of 100, 200, the load buffer and link table can be populated as follows after an $8^{th}$ instance of the load instruction. Thus, when a $9^{th}$ instance of the load instruction begins execution, the load buffer can be accessed with the IP Y, which returns the load address history of 100, 200. Based on an access of the link table with that load address history, a predicted load address of 150 is generated for the $9^{th}$ instance of the load instruction.

TABLE TWO

| LOAD BUFFER | | LINK TABLE | |
|---|---|---|---|
| IP | LOAD ADDRESS HISTORY | INDEXING & TAG | PREDICTED LOAD ADDRESS |
| — | — | 100,200 | 150 |
| IP Y | 100,200 | 200,150 | 250 |
| — | — | 150,250 | 200 |
| — | — | 250,200 | 300 |
| — | — | 200,300 | 100 |
| — | — | 300,100 | 200 |

After execution of the $9^{th}$ instance of the load instruction, the load address history of the load buffer can be updated with the load address of the $9^{th}$ instance of the load instruction to replace the oldest load address in the load address history. Table Three shows how the load buffer and link table can be populated after such an update. Thus, when a $10^{th}$ instance of the load instruction begins execution, the load buffer can be accessed with the IP Y, which returns the load address history of 200, 150. Based on an access of the link table with that load address history, a predicted load address of 250 is generated for the $10^{th}$ instance of the load instruction.

TABLE THREE

| LOAD BUFFER | | LINK TABLE | |
|---|---|---|---|
| IP | LOAD ADDRESS HISTORY | INDEXING & TAG | PREDICTED LOAD ADDRESS |
| — | — | 100,200 | 150 |
| IP Y | 200,150 | 200,150 | 250 |
| — | — | 150,250 | 200 |
| — | — | 250,200 | 300 |
| — | — | 200,300 | 100 |
| — | — | 300,100 | 200 |

While this embodiment is described a having a load address history including two load addresses, other embodiments of the present invention can include other numbers of load addresses in a load address history, such as three load addresses, four load addresses, n addresses, etc.

Thus, embodiments of the present invention can generate a predicted load address for a particular load instruction based on a history of prior load addresses for that particular load instruction. Embodiments of the present invention can predict an address of a sequence of addresses, which sequence of addresses may not have a level of regularity that can be predicted by a stride predictor (e.g., because the sequence lacks a regular offset, etc.). Embodiments of the present invention are not limited to load address prediction. Embodiments of the present invention can encompass other types of address prediction including store address prediction, indirect branch address prediction, etc. According to one embodiment of the present invention, a correlated load address predictor can predict an address of a finite ordered sequences of addresses.

To reduce the size of each load address history stored in a load address history field of an entry of a load buffer (e.g., stored in load address history field 106), in one embodiment, a compression scheme can be used to reduce the size of each load address history. In accordance with one embodiment, a load address history is updated by shifting the load address history by a few bits (e.g., three or four bits) before XORing it with a subset of the new load address to merge into the load address history. The subset of the new load address can include all the least significant bits except for the last two (e.g., which may matter on unaligned accesses).

Embodiments of the present invention can utilize different confidence schemes to keep the prediction accuracy high. In one embodiment, control-flow indications are recorded in a flow field of a buffer entry stored in a load buffer. A first control-flow technique records in the flow field of a load buffer entry the N least significant bits of the global branch history register (e.g., typically the first to fourth least significant bits). The recording can be done when a speculative access is performed and the predicted load address is incorrect. Subsequent predictions where the recorded pattern matches the value of the global branch history register will not be used to perform a speculative memory operation (e.g., access a cache). The technique can record one path of mispredictions, e.g., the last one. Another control-flow technique records several paths of mispredictions to deliver better performance. $2^N$ bits can be recorded in a flow field of a buffer entry stored in the load buffer. One bit can be associated with one path (e.g., one combination of the N bits of the global branch history register). Recorded bits can indicate the accuracy of the speculative access a last time the speculative access was performed on the paths.

In an embodiment, a link table may be extended with an additional field of pool bits. Pool bits can be utilized to reduce the likelihood that irregular accesses or finite ordered sequences of addresses that are too large for an embodiment will trash (e.g. fill will incorrect data, fill with irregular data, etc.) the link table. Pool bits can be used to guard link table updates. The pool bits can record a subset of the last predicted load address for each link entry (e.g., usually the least significant bits of the predicted load address of the last. load instruction), which may differ from the recorded predicted load address when the predicted load address was not updated on the last misprediction. Thus, the pool bits can be updated on each misprediction, and the predicted load address can be updated only when the pool bits match the correct predicted load address. As a result, the predicted load address may be updated only during the second instance of that predicted load address, and the amount of irregular accesses that update the link table can be reduced.

Figure 2:
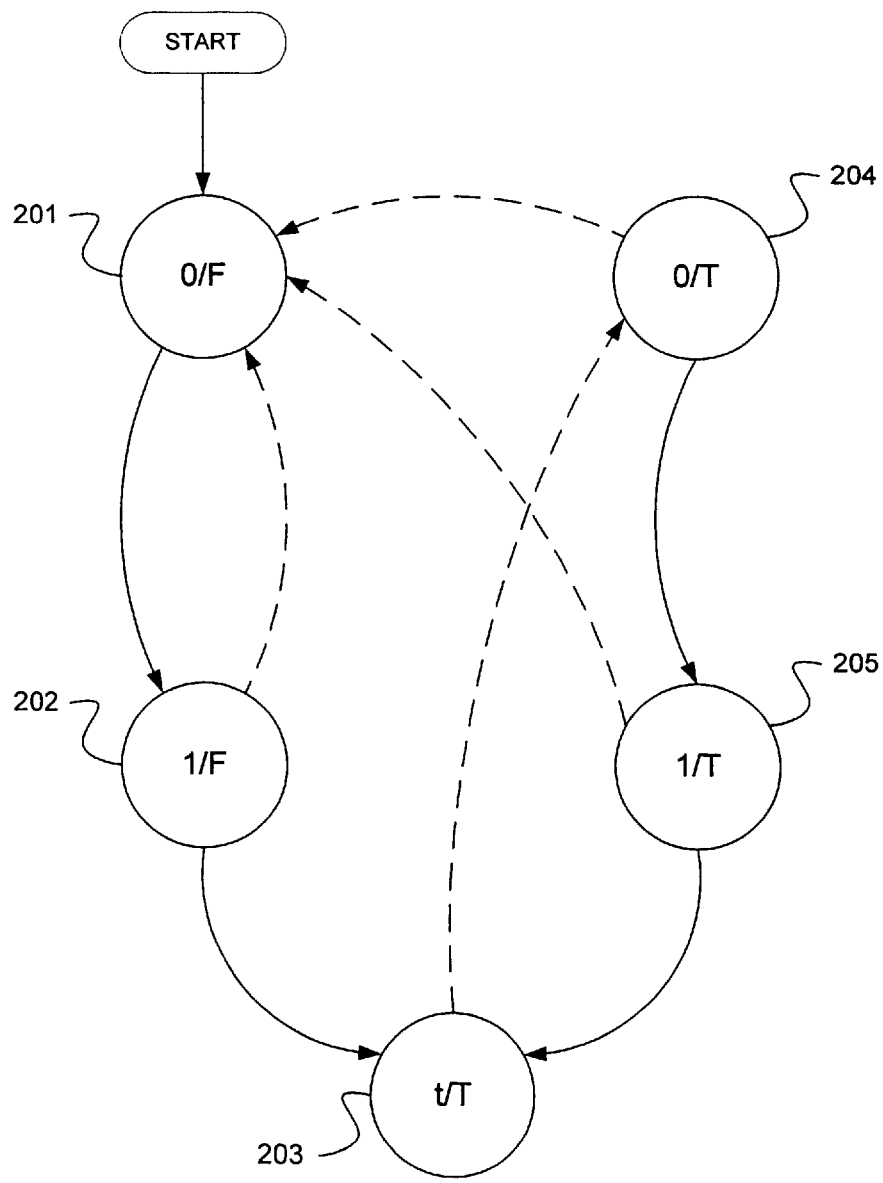
FIG. 2 illustrates the operation of a confidence state machine in accordance with an embodiment of the present invention.

FIG. 2 illustrates the operation of a confidence state machine in accordance with an embodiment of the present invention. For example, a confidence value stored in a confidence value field 104 of a buffer entry of the load buffer 100 can include one or more bits to store a counter value and an extra hysterisis value bit. The counter value be incremented based on a correct prediction and reset to zero on misprediction. The hysterisis bit can initially be cleared (e.g., to one of a first predetermined potential $V_{cc}$, and ground, etc. ) and can be set (e.g., to the other one of a first predetermined potential $V_{cc}$ and ground, etc.) when the counter reaches the threshold value. The hysterisis bit can be cleared on a misprediction when the counter value is below the threshold value. In embodiments of the present invention, performance of a speculative memory access based on predicted address is dependent upon a confidence value, (e.g., speculative memory access will not be performed unless the confidence value is above a certain confidence threshold, speculative memory access will not be performed unless a hysterisis bit is set, etc.) In embodiment of the present invention, including a hysterisis value bit as part of a confidence value has improved prediction accuracy.

In the embodiment illustrated in FIG. 2, the threshold counter value to allow speculative memory access based on a predicted address is two. At each state, when a predicted address is generated, there is no speculative access unless the hysterisis bit is set as TRUE. The counter value is zero at state 201, and the hysterisis bit is cleared as FALSE. At state 201, when the predicted address is incorrect, the counter remains at zero, the hysterisis bit remains cleared as FALSE, and the confidence state machine remains at state 201. At state 201, when the predicted address is correct (e.g., a predicted address matched the actual address), the counter value is incremented, the hysterisis bit remains cleared as FALSE, and the confidence state machine moves to state 202. At state 202, when the predicted address is incorrect, the counter is reset to zero, the hysterisis bit remains cleared as FALSE, and the confidence state machine returns to state 201. At state 202, when the predicted address is correct, the counter value is incremented, the hysterisis bit is set as TRUE, and the confidence state machine moves to state 203.

At state 203, the hysterisis bit is set as TRUE and speculative memory access is enabled based on predicted address. At state 203, when the predicted address is incorrect, the counter is reset to zero, the hysterisis bit remains set as TRUE, and the confidence state machine moves to state 204. The hysterisis bit is not cleared to FALSE because it is cleared to FALSE on a misprediction when the counter is below the threshold value (e.g., the hysterisis bit allows the correlated load predictor a misprediction when the counter is at or above the threshold level). At state 203, when the predicted address is correct, the counter value can be saturated at two (e.g., count no higher than two), and the confidence state machine remains at state 203.

At state 204, when the predicted address is incorrect, the counter remains at zero, the hysterisis bit is cleared to FALSE, and the confidence state machine returns to state 201. The hysterisis bit is cleared to FALSE because the counter at state 204 is below the threshold value. At state 204, when the predicted address is correct, the counter value is incremented, the hysterisis bit remains set as TRUE, and the confidence state machine moves to state 205. At state 205, when the predicted address is incorrect, the counter is reset to zero, the hysterisis bit is cleared to FALSE, and the confidence state machine returns to state 201. The hysterisis bit is cleared to FALSE because the counter at state 205 is below the threshold value. At state 205, when the predicted address is correct, the counter value is incremented, the hysterisis bit remains set as TRUE, and the confidence state machine moves to state 203. In other embodiments of the present invention, varied counter and hysterisis techniques can be implemented (e.g., using three counter bits to counter from 0 to n, decrementing the counter upon a misprediction, etc.).

Figure 3:
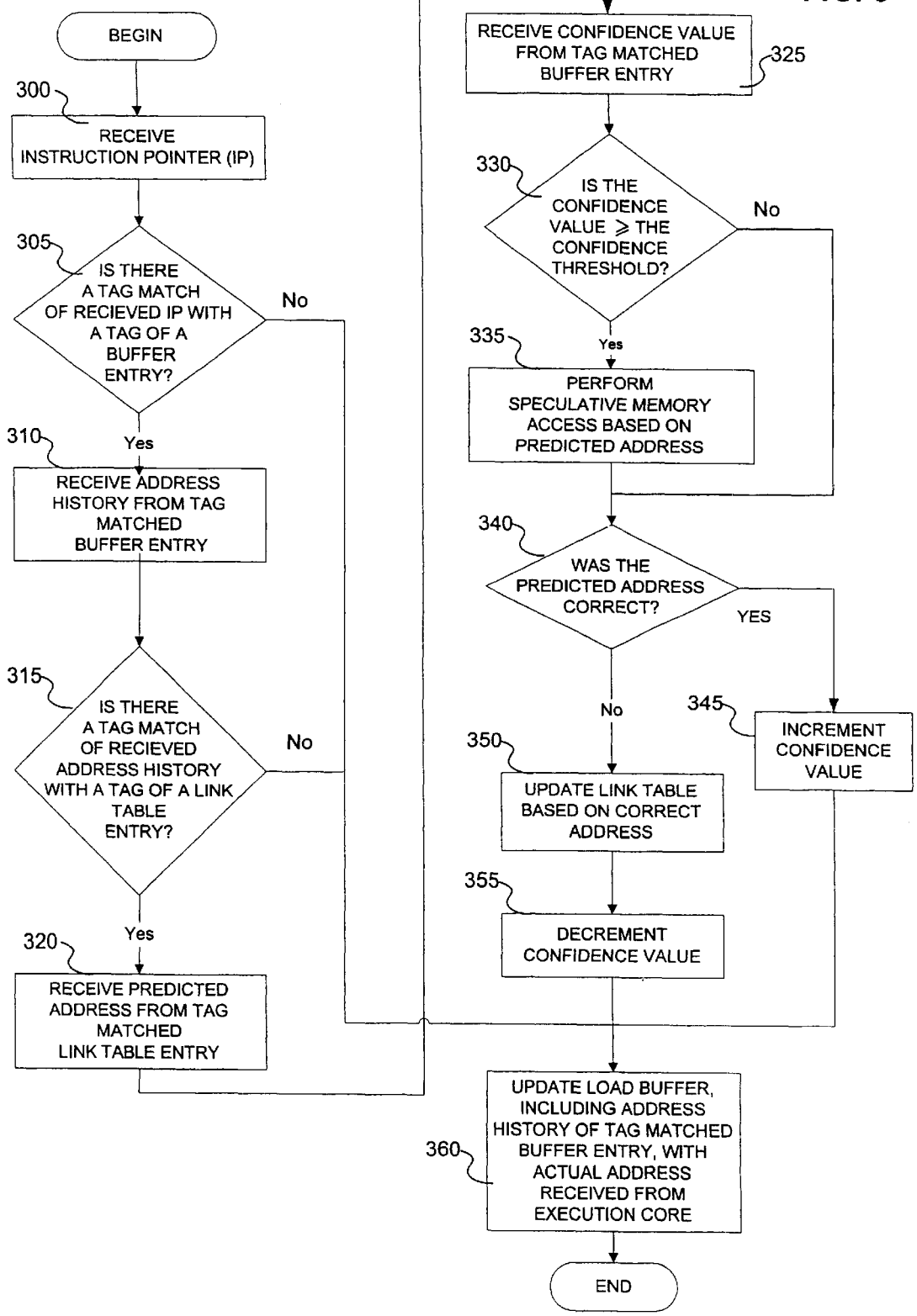
FIG. 3 illustrates a method in accordance with an embodiment of the present invention.

FIG. 3 illustrates a method in accordance with an embodiment of the present invention. Embodiments of the present invention can perform address prediction to enable speculative memory access operations such as speculative load instructions, speculative store instructions, etc. In another embodiment of the present invention, indirect branch instruction prediction can be performed. An instruction pointer (IP) is received (box 300). Whether there is a tag match between the received IP with a tag of a buffer entry of a history buffer can be determined (box 305). When there is no tag match, no address prediction is performed, but the load buffer, including the address history of the tag matched buffer entry, is updated with the actual load address received from the execution core (box 360). When there is a tag match, an address history can be received from the tag matched buffer entry (box 310). Whether there is a tag match between the received address history with a tag of a link table entry can be determined (box 315). When there is no match, no address prediction is performed, but the load buffer, including the address history of the tag matched buffer entry, is updated with the actual load address received from the execution core (box 360). When there is a tag match, a predicted address can be received from the tag matched link table entry (box 320). A confidence value can be received from the tag matched buffer entry (box 325). Whether the confidence value is equal to or greater than the confidence threshold value can be determined (box 330). When the confidence value is greater than or equal to the confidence threshold value, then a speculative memory access operation can be performed based on the predicted address (box 335). When the confidence value is less than the confidence threshold value, then a speculative memory access operation is not performed. Whether the predicted address was correct can be determined, whether or not a speculative memory access operation was performed (box 340). When the predicted address was correct, a confidence value in the tag matched operation buffer entry can be incremented (box 345) and the load buffer, including the address history of the tag matched buffer entry, is updated with the actual load address received from the execution core (box 360). When the predicted address was incorrect, the link table can be updated based on the correct address (box 350), the confidence value in the tag matched buffer entry can be decremented (box 355), and the load buffer, including the address history of the tag matched buffer entry, is updated with the actual load address received from the execution core (box 360).

Figure 4:
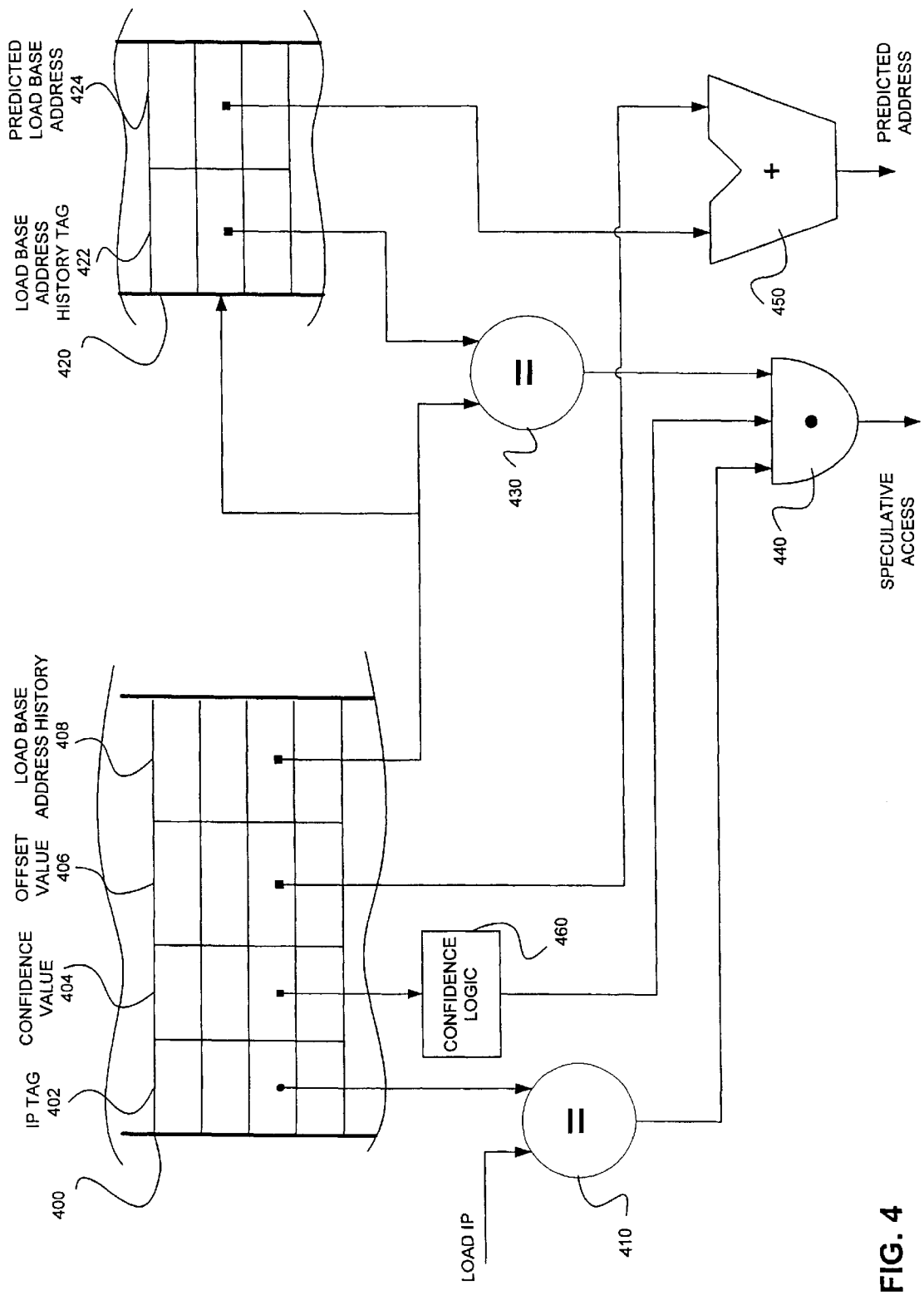
FIG. 4 shows an apparatus in accordance with an embodiment of the present invention.

FIG. 4 shows an apparatus in accordance with an embodiment of the present invention. The microprocessor can include a correlated load address predictor that include a load buffer 400 and a link table 420. Each of load buffer 400 and link table 420 can be implemented in a table memory, e.g., a table memory in a cache, a table memory in a memory, etc. In one embodiment, the load address history of load instruction stored in the load buffer includes the load base address history not including an offset. The load base address history can be stored because many load instructions can share the same sequences of base addresses, i.e., they can be highly correlated. In such a case, the offset, which can be different for each of such load instructions, can be stored separately in the load buffer.

In one embodiment, load buffer 400 can be populated with a plurality of buffer entries, each buffer entry including an IP tag field 402, a confidence value field 404, an offset value field 406, and load base address history field 408. Load buffer 400 can cache information about previously executed load instructions, including offset values and load base address histories of particular load instructions.

For example, a particular load instruction can specify a base address (e.g., a first value stored in a first register, a constant value, etc.) and an offset (e.g., a second value stored in a second register, an immediate value, etc.). The load address of the load instruction can be based on an arithmetic operation involving the base address and the offset (e.g., the base address incremented by the offset, etc.).

Thus, in one embodiment, each buffer entry of a load buffer 400 can include an IP tag corresponding to a load IP of a load instruction stored in IP tag field 402, a confidence value stored in confidence value field 404, an offset value stored in offset value field 406, and a load base address history of the load instruction stored in load base address history field 408. The load buffer 400 can be indexed according to the LSBs of each load IP, and the IP tags can consist of the MSBs of each load IP.

The load base address history entries of a load buffer can be used to index a link table so that links (e.g., the link between a load base address history and a predicted base address, etc.) recorded in the link table are shared between correlated loads. Such an embodiment can be advantageously used during execution of pointer chasing programs, which can exhibit correlated loads behavior. The link table can be indexed by the load base address history recorded in the load buffer. Each link table entry can be tagged with the most significant bits of the load base address history. Thus, a load buffer may record enough bits of the base address history to perform both indexing and tag matching with respect to the link table. Accordingly, link table 420 can be indexed according to the load base address history of a load instruction. Each link entry in the link table 420 can include (1) a load base address history tag filed 422 corresponding to the load base address history of a load instruction, and (2) a predicted load base address field 424 to store a predicted load base address of the load instruction.

Load buffer 400 can be in communication with first comparator 410, which can receive a load operation instruction pointer ("load IP"). The first comparator 410 can perform a tag comparison based on the received load IP and the IP tags of the buffer entries of load buffer 400, and generate a buffer hit/miss indication to indicate whether load buffer 400 stores load base address history corresponding to the received load IP. AND 440 can receive the buffer hit/miss indication and generate a speculative access indication based in part on the buffer hit/miss indication.

When there is an buffer hit based on the received load IP, a confidence value stored in a confidence value field 404 of the hit buffer entry can be received by confidence logic 460. In one embodiment, the received confidence value is a counter value that is incremented on each correct prediction and reset to zero when there is a misprediction. For example, when there is an load buffer hit based on a load IP and a predicted address is generated, a confidence value stored in confidence value field 404 of that hit operation entry can be incremented when the predicted address is correct and can be reset when the predicted address is incorrect. The confidence logic 460 can generate a confidence indication based on the received confidence value. AND 440 can receive the confidence indication and generate the speculative access indication based in part on the confidence indication.

When there is a load buffer hit based on the load IP, a load base address history stored in the load base address history field 408 of the hit buffer entry can be received by second comparator 430. The second comparator 430 can perform a tag comparison based on the received load base address history and the load base address history tags of the link entries stored link table 420, and generate a link table hit/miss indication to indicate whether link table 420 stores a predicted load base address for the load instruction. AND 440 can receive the link table hit/miss indication and generate the speculative access indication based in part on the link table hit/miss indication.

When there is a link table hit based on the received load base address history, a predicted load base address stored in the predicted load base address field 424 of the hit link entry can be received by adder 450. An offset value stored in the offset value field 406 of the hit buffer entry can also be received by adder 450. The adder 450 can add the received predicted load base address of the hit link entry with a received offset value of the hit buffer entry to generate a predicted load address. Based on the status of speculative access indication, the predicted load address may or may not be used to perform a speculative memory access (e.g., a speculative load from a cache, etc.).

In one embodiment, the offset value stored in a load buffer is not the immediate offset (e.g., the offset that combined with the base address comprises the load address, etc.) but only the least significant bits of the immediate offset (e.g., typically 8 bits). The most significant bits of the immediate offset not stored as the offset value can be added to the load base address history stored in the buffer entry. Such an embodiment can be used when accessing hashing functions, and the base address history values can be different across several functions. Thus, aliasing effects in the link table are reduced.

In accordance with one embodiment of the present invention, instructions adapted to be executed by a processor to perform a method are stored on a computer-readable medium. The computer-readable medium can be a device that stores digital information. For example, a computer-readable medium includes a ROM as is known in the art for storing software (e.g., microcode). The computer-readable medium can be accessed by a processor suitable for executing instructions adapted to be executed. The term "adapted to be executed" is meant to encompass any instructions that are ready to be executed in their present form (e.g., machine code) by a processor, or require further manipulation (e.g., compilation, decryption, or provided with an access code, etc.) to be ready to be executed by a processor.

Methods and apparatus in accordance with embodiments of the present invention can advantageously perform correlated load address prediction. A load address history of a load instruction can be recorded in a load buffer, and a link table can link the load address history to a predicted load address. Correlated load address prediction can advantageously predict load addresses and enable speculative memory access operations for sequences of address that do not exhibit a constant regular behavior. Embodiments of the present invention encompass other types of address prediction, such as store address prediction, indirect branch address prediction, etc.

In the foregoing detailed description, apparatus and methods in accordance with embodiments of the present invention have been described with reference to specific exemplary embodiments. For purposes of explanation, numerous specific details have been set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention. Accordingly, the present specification and figures are to be regarded as illustrative rather than restrictive.

We claim:

1. A microprocessor having a correlated load address predictor, the correlated load address predictor comprising:

a first table memory populated by a plurality of buffer entries, each buffer entry including a first buffer field to store a first tag based on a load instruction pointer, each buffer entry further including a second buffer field to store a load address history;

a second table memory populated by a plurality of link entries, each link entry including a first link field to store a link tag based on another load address history, each link entry further including a second link field to store a load predicted address;

a first comparator in communication with said first table memory and an load instruction pointer input;

a second comparator in communication with said first table memory and said second table memory; and an output in communication with said second table memory.

2. The microprocessor of claim 1, wherein each buffer entry further includes a third buffer field to store an offset value.

3. The microprocessor of claim 2, wherein said output is further coupled to said first table memory.

4. The microprocessor of claim 1, wherein each buffer entry further includes a fourth buffer field to store a confidence value.

5. The microprocessor of claim 4, wherein the correlated load address predictor further comprises confidence logic in communication with said first table.

6. The microprocessor of claim 5, wherein the correlated load address predictor further comprises a control circuit in communication with said first comparator, said second comparator, and said confidence logic.

7. A method of correlated load address prediction, the method comprising:

determining that a received instruction pointer matches a first instruction pointer tag of a buffer entry;

receiving an address history of the buffer entry based on the instruction pointer match;

determining that the address history matches an address history tag of a link table entry;

receiving a predicted address of the link table entry based on the address history match; and receiving an offset value of the buffer entry link based on the instruction pointer match.

8. The method of claim 7, further comprising generating a second predicted address based at least in part on the received offset value of the buffer entry and the received predicted address of the link table entry.

9. The method of claim 8, further comprising:

performing a memory access operation based at least in part on the generated second predicted address.

10. The method of claim 7, further comprising:

determining that the received predicted address was correct; and updating a confidence value stored in the buffer entry.

11. The method of claim 7, further comprising:

determining that the received predicted address was incorrect;

based at least in part on a correct address, updating predicted address stored in the link table entry; and updating a confidence value stored in the buffer entry.

12. The method of claim 7, further comprising:

receiving an actual address; and updating the address history of the buffer entry based on said actual address.

13. A computer-readable medium storing a plurality of instructions to be executed by a processor to perform correlated load address prediction, the plurality of instructions comprising instructions to:

determine that a received instruction pointer matches a first instruction pointer tag of a buffer entry;

receive an address history of the buffer entry based on the instruction pointer match;

determine that the address history matches an address history tag of a link table entry;

receive a predicted address of the link table entry based on the address history match; and receive an offset value of the buffer entry link based on the instruction pointer match.

14. A method of correlated load address prediction, the method comprising:

determining that a received instruction pointer matches a first instruction pointer tag of a buffer entry;

receiving an address history of the buffer entry based on the instruction pointer match;

determining that the address history matches an address history tag of a link table entry;

receiving a predicted address of the link table entry based on the address history match; and receiving a confidence value of the buffer entry link based on the instruction pointer match.

15. The method of claim 14, further comprising:

generating a confidence indicator based at least in part on the received confidence value.

16. The method of claim 15, further comprising:

generating a memory access indication based at least in part on the generated confidence indicator.

17. The method of claim 16, further comprising:

performing a memory access operation based at least in part on the generated memory access indication and the received predicted address.

18. A method of correlated load address prediction, the method comprising:

determining that a received load instruction pointer matches a first instruction pointer tag of a buffer entry;

receiving a load address history of the buffer entry based on the load instruction pointer match;

determining that the load address history matches a load address history tag of a link table entry; and receiving a predicted load address of the link table entry based on the load address history match.

\* \* \* \* \*